United States Patent [19]

Ishikawa

[11] 4,430,213
[45] Feb. 7, 1984

[54] ULTRAFILTRATION UNIT

[76] Inventor: Soji Ishikawa, No. 6-22, Miyazaki 6-chome, Takatsu-ku, Kawasaki-shi, Kanagawa-ken, Japan

[21] Appl. No.: 347,161

[22] Filed: Feb. 9, 1982

[30] Foreign Application Priority Data

Jul. 8, 1981 [JP] Japan .................. 56-101327

[51] Int. Cl.³ .............................. B01D 31/00
[52] U.S. Cl. ................. 210/136; 210/416.1; 210/433.2; 210/445
[58] Field of Search .......... 210/433.2, 927, 445, 210/136, 416.1, 446, 447

[56] References Cited

U.S. PATENT DOCUMENTS

| | | | |
|---|---|---|---|
| 2,566,354 | 9/1951 | Morey | 210/446 X |
| 3,389,801 | 6/1968 | Sieger | 210/136 X |
| 3,406,828 | 10/1968 | Boston | 210/445 X |
| 3,421,628 | 1/1969 | Barnabe et al. | 210/136 X |
| 3,705,100 | 12/1972 | Blatt et al. | 210/927 X |
| 3,795,088 | 3/1974 | Esmond | 210/927 X |
| 3,935,111 | 1/1976 | Bentley | 210/446 |

OTHER PUBLICATIONS

Catalogue by Japan Millipore Ltd.

Primary Examiner—Frank A. Spear, Jr.
Attorney, Agent, or Firm—Armstrong, Nikaido, Marmelstein & Kubovcik

[57] ABSTRACT

An ultrafiltration unit for the separation of the colloidal or very fine solid material by filtration through microporous or semipermeable mediums. The unit comprises a filter housing formed by an upper part and a lower part airtightly connected together and a filter internally disposed in the housing. The upper part of the housing has an inlet pipe at its top and a check valve is provided in the inlet pipe. A liquid sample is forced in the upper part of the housing together with air through the inlet pipe, pressed by the pressure of the air and then filtered. An escaping of the air can be blocked by the check valve provided in the inlet pipe of the upper part of the housing.

1 Claim, 3 Drawing Figures

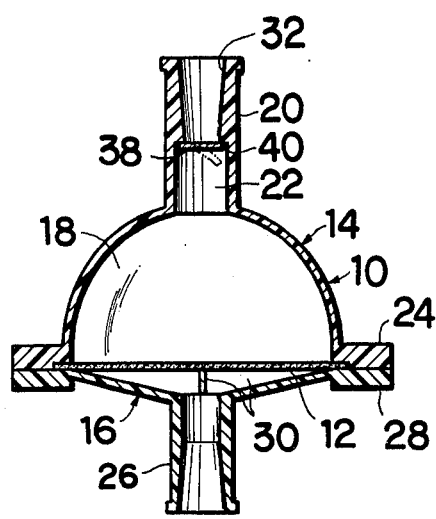
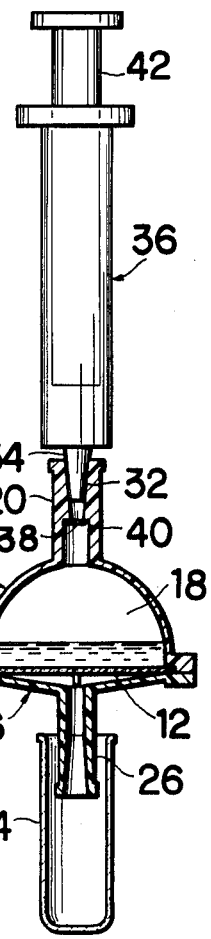
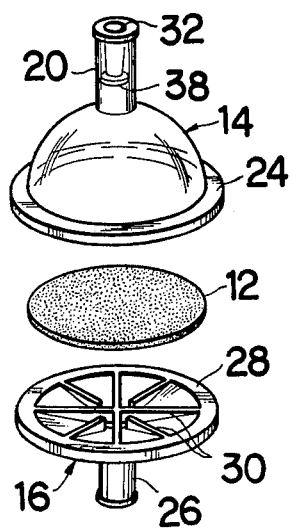

ULTRAFILTRATION UNIT

BACKGROUND OF THE INVENTION

1. Field of the Invention

The present invention relates to an ultrafiltration unit for the separation of colloidal or very fine solid material by filtration through microporous or semipermeable mediums.

2. Description of the Prior Art

There has been provided an ultrafiltration unit which is designed to pass a sample, e.g., a plasma sample, through a microporous or semipermeable filter, so-called an ultrafilter, and to make a protein-free plasma sample by separating protein through the ultrafilter. Such prior ultrafiltration unit comprises a wineglass-shaped member with an ultrafilter disposed therein. There is formed a chamber under the filter and a stem portion of the member is made of a hollow pipe having a bore therein which communicates with the chamber under the filter. The bore of the stem pipe is, at its free end, flared so as to be press fitted over a snout of a syringe in a manner so-called Leur taper coupling. The ultrafiltration is effected in this prior unit such that, after attaching the snout of the syringe to the stem pipe of the unit, a liquid sample, e.g., a plasma sample is poured onto the filter rested in the unit, and then a plunger of the syringe fixed to the stem pipe of the unit is pulled, so that there is produced a vacuum in the chamber formed underneath the filter in the unit. As a result, the sample percolates the filter by the atmospheric pressure and oozes out into the syringe.

In this conventional unit, however, there is a disadvantage that there is no way of restoring a vacuum condition once again when the vacuum in the chamber loses during the ultrafiltration, since it is no longer possible to reciprocate the plunger of the syringe after the same has been fixed to the stem pipe of the unit.

There is another disadvantage that there is further needed a supporting means, such as a stand, for holding the syringe, since the plunger of the syringe must be kept pulled during the ultrafiltration.

Further, there is a disadvantage that, since a filtered sample is collected in the syringe, there is required a further step to empty the sample into a test tube for a test in the next stage, which results in a considerable amount of loss of the sample.

SUMMARY OF THE INVENTION

Therefore, an object of the present invention is to provide an improved ultrafiltration unit wherein the ultrafiltration can be effected by pressurized air contrary to the conventional unit, and wherein a plunger of a syringe can be reciprocated so as to restore the pressure of air again, even when the pressure decreases by accident during the ultrafiltration.

Another object of the present invention is to provide an improved ultrafiltration unit which has a simple construction and is less expensive, wherein any supporting means for a syringe is no longer needed.

Further object of the present invention is to provide an improved ultrafiltration unit, wherein a filtered sample can be directly collected in a test tube, without loss.

With the above and other objects in view, the present invention provides an improved ultrafiltration unit which comprises a filter housing including an upper part and a lower part airtightly connected together and a filter internally disposed in the housing and sandwiched between the parts of the housing. Said upper part of the housing has an inlet pipe at its top and a check valve is provided in the inlet pipe. A liquid sample is forced in the upper part of the housing through the inlet pipe together with air, pressed by the pressure of the air and then filtered. An escaping of the air can be blocked by the check valve provided in the inlet pipe of the upper part of the housing, during the ultrafiltration.

BRIEF DESCRIPTION OF THE DRAWINGS

The features which are believed to be novel and characteristic of this invention are set forth particularly in the appended claims. The invention itself, however, both as to its construction and mode of operation, together with the further objects and advantages thereof, will become more apparent and understandable as the description proceeds hereinbelow, with reference made to the accompanying drawings, wherein like reference characters denote like parts throughout the views, and wherein:

FIG. 1 is a cross sectional view showing an ultrafiltration unit in accordance with the present invention;

FIG. 2 is an exploded perspective view of the unit shown in FIG. 1; and

FIG. 3 is an explanatory cross-sectional view of the unit, in which a sample is forced in the unit for the ultrafiltration.

DESCRIPTION OF THE PREFERRED EMBODIMENT

Referring now to the drawings, there is shown an ultrafiltration unit 10 constructed in accordance with the teaching of the present invention generally includes a housing 12 disposed internally of a housing which is constructed of an upper part 14 and a lower part 16 disposed on opposite sides of the filter 12.

The filter 12 is a microporous or semipermeable filter, so-called an ultrafilter. The filter 12 is disc-shaped in the embodiment.

The upper part 14 of the housing, which is adapted to function as the inlet side of the unit, is a dome-shaped member having a chamber 18 therein, which is also dome-shaped. The upper part 14 has, at its top, an inlet pipe 20 which protrudes outwardly therefrom. The inlet pipe 20 has a bore 22 throughout its length, which communicates with the chamber 18 positioned thereunder. Further, there is formed a flange 24 along the peripheral edge of the upper part 14. The upper part 14 of the housing should preferably be dome-shaped, but should not be limited thereto.

The other lower part 16 of the housing is a funnel-shaped member and is adapted to function as the outlet side of the unit. The lower part 16 has an hollow outlet pipe 26, at the center of the bottom, which protrudes outwardly therefrom. The inner surface of the funnel-shaped part 16 slants downwardly towards the center thereof where an end of the hollow pipe 26 is positioned. Similarly, there is formed a flange 28 along the peripheral edge of the lower part 16 of the housing.

The upper and lower parts 14, 16 of the housing are connected airtightly and sealed together, with their recessed portions opposing each other, while meeting their flanges 24, 28 and holding the peripheral edge of the filter 12 therebetween. Thus, the filter 12 is internally disposed in the housing and sandwiched between the upper and lower parts 14, 16 of the housing. When the parts 14, 16 of the housing are made of a plastic material, they can be preferably connected together by a high-frequency welding.

There are formed a plurality of ribs 30 on the slanted surface of the lower part 16 for supporting the filter 12 thereon.

The bore 22 of the inlet pipe 20 of the upper part 14 of the housing is flared from the intermediate towards its free end, so that there is formed a flared bore section 32 in the bore 22 of the inlet pipe 20, which is shaped and sized to tightly engage with a snout 34 of a syringe 36 in a manner so-called Leur taper coupling, as shown in FIG. 3. If desired, there may be provided a lock-mechanism at the pipe 20 and the syringe 36 in order to ensure more firm gripping of the pipe and the syringe during the ultrafiltration.

Reference numeral 38 designates a check valve, which is provided at the shoulder portion 40 formed at the adjacent below the flared bore section 32 in the inlet pipe 20. The peripheral edge of the check valve 38 is partially fixed to the shoulder portion 40 by, for instance, a high-frequency welding, so that the valve 38 can bend inwardly or towards the filter 12 so as to allow a liquid and a gas to enter in the chamber 18 of the upper part 14 of the housing, and is then thrusted against the shoulder portion 40 by the pressure of the gas after the same has been introduced in the chamber 18 of the housing. Thus, the shoulder portion 40, which functions as a valve seat of the valve 38, blocks the outward bending of the valve 38 so as to prevent a liquid and a gas from flowing backward.

The structure of the valve 38 should not be limited to the type shown in the embodiment, and any other valve can be used here, provided that it can allow a liquid and a gas to flow in one direction, i.e., in the direction that they are permitted to flow in the chamber 18, and can block the backward flow of a liquid and a gas which have been once introduced in the chamber 18.

Nextly, mode of operation of the unit will be explained hereinafter. After pulling a plunger 42 of the syringe 36 and taking a liquid sample therein, the plunger 42 should be pulled further so that air is inhaled in the syringe 36. The quantity of the air to be inhaled in the syringe should be as same as that of the liquid sample in the syringe, or more. Then, as shown in FIG. 3, the snout 34 of the syringe 36 is press fitted in the flared bore section 32 of the inlet pipe 20 of the upper part 14. Nextly, by pushing the plunger 42 of the syringe 36 to the maximum, the sample as well as the air in the syringe 36 is forced in the chamber 18 through the inlet pipe 20, so that pressure in the chamber 18 becomes high as a result of the air forced therein. The compressed air in the chamber 18 can be sealed there by the function of the check valve 38. Therefore, the sample under the pressure of the compressed air in the chamber 18 passes through the filter 12 and exudes slowly in the lower part 16 as time goes by, i.e., within 30 to 60 minutes. The filtered sample flows the slanted surface of the lower part 16 and is led into a test tube 44 through the outlet pipe 26, which can be subject to a next test immediately.

Even when the pessure of the air in the chamber 18 drops by accident as the ultrafiltration continues, it will be possible to restore the pressure of the air in the chamber high once again, by injecting air newly in the chamber 18 by the syringe 36, again.

Having described as above, the ultrafiltration can be effected by the pressure of injected air from the syringe and after the injection, the syringe is merely rested on the unit without keeping its plunger pulled during the ultrafiltration, so that it is not necessary to support the syringe by a stand. And since the filtered sample is directly collected in the test tube without loss, the sample can be immediately subject to a test at the next stage.

While the above description discloses a preferred embodiment of the present invention, it is to be understood that numerous modifications of alterations may be made without departing from the scope of the invention as set forth in the following claims.

What is claimed is:

1. An ultrafiltration unit for use with a syringe having a tapered snout, consisting of:
   a housing having a dome-shaped upper part provided with a flange at its peripheral edge and a funnel-shaped lower part provided with a flange at its peripheral edge which are airtighty connected and sealed together along the peripheral flanges, said upper part having a single inlet pipe at its top and a chamber therein for forcing a sample liquid and air in the chamber, a bore of the inlet pipe being partially flared from the intermediate toward its free end for allowing to engage with the snout of the syringe and being provided with a shoulder portion adjacent below the flared bore section, said lower part having an internal slanted surface and a single outlet pipe at its apex,
   a disc-shaped ultrafilter internally disposed in the housing held between the peripheral flanges of the upper and lower parts of the housing and supported on a plurality of radial support ribs integrally formed on the slanted surface of the lower part of the housing, and
   a check valve provided in the inlet pipe, said check valve being partially fixed to the shoulder portion in the inlet pipe so as to be bendable downwardly toward the chamber or thrustable against the shoulder portion, whereby a sample liquid and air can be forced into the chamber of the upper part of the housing while escape of the air is blocked.

* * * * *